US006999053B2

(12) United States Patent
Lee et al.

(10) Patent No.: US 6,999,053 B2
(45) Date of Patent: Feb. 14, 2006

(54) DISPLAY APPARATUS WITH A TIME DOMAIN MULTIPLEX DRIVING CIRCUIT

(75) Inventors: Hsin-Ta Lee, Taoyuan (TW); Wen-Chieh Lin, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 328 days.

(21) Appl. No.: 10/384,218

(22) Filed: Mar. 6, 2003

(65) Prior Publication Data

US 2003/0169223 A1 Sep. 11, 2003

(30) Foreign Application Priority Data

Mar. 6, 2002 (TW) ............................... 91104167 A

(51) Int. Cl.
*C09G 3/36* (2006.01)

(52) U.S. Cl. ........................... 345/92; 345/55; 345/100

(58) Field of Classification Search .................. 345/92, 345/100, 87, 55
See application file for complete search history.

(56) References Cited

U.S. PATENT DOCUMENTS 6,707,441 B1 * 3/2004 Hebiguchi et al. ............ 345/92
2002/0070905 A1 * 6/2002 Kodate et al. ................ 345/55

* cited by examiner

*Primary Examiner*—Amr A. Awad
*Assistant Examiner*—Leonid Shapiro
(74) *Attorney, Agent, or Firm*—Thomas, Kayden, Horstemeyer & Risley

(57) ABSTRACT

A display apparatus with a time domain multiplex driving circuit includes a first scan line, a first data line perpendicular to the first scan line, a first pixel and a second pixel which are set on different sides of the first data line and coupled to the same data line, a first switching device and a second switching device set in the first and second pixel respectively. The first switching device is for selectively transmitting a pixel signal from the data line to the first pixel and the second switching device is for selectively transmitting a pixel signal from the data line to the second pixel. When the pixel signals of equal magnitude are individually applied to the first and second pixels, the feed-through voltages of the first and second pixels are substantially equal.

30 Claims, 7 Drawing Sheets

DISPLAY APPARATUS WITH A TIME DOMAIN MULTIPLEX DRIVING CIRCUIT

This application claims the benefit of Taiwan application Ser. No. 091104167, filed on Mar. 6, 2002.

BACKGROUND OF THE INVENTION

1. Field of the Invention

The invention relates in general to a display apparatus, and more particularly to a display apparatus with a time domain multiplex driving circuit.

2. Description of the Related Art

Featuring the favorable properties of thinness, lightness and generating low radiation, liquid crystal display (LCDs) have been widely used in computer systems. A LCD panel typically uses an active matrix circuit for driving its pixels. In order to achieve a higher resolution and aperture ratio of the panel products, the industry focuses on developing improved driving circuits and associated driving methods, as well as reducing both manufacturing costs and size of the driving circuit apparatus.

FIG. 1 shows a circuit diagram illustrating a conventional LCD panel. The display panel includes a plurality of pixels (P) which are arranged in the form of a matrix on the display panel, and an active matrix driving circuit for driving the pixels. The active matrix driving circuit includes a plurality of scan lines (S), a plurality of data lines (D), and a plurality of switching devices. The switching devices are set in the pixels for selectively delivering the corresponding data signals to the pixels. Each scan line is perpendicular to each data line. Each pixel in the same pixel row is coupled to the same scan line and each pixel in the same pixel column is coupled to the same data line. The switching device can be a thin film transistor (TFT) such as an n-type field effect transistor (n-FET) or a p-type field effect transistor (p-FET). In FIG. 1, the switching device of each pixel includes at least a thin film transistor. The thin film transistor in each pixel includes a gate electrode, a first-source/drain electrode, and a second source/drain electrode. The gate electrode of the thin film transistor is coupled to the corresponding scan line and the first source/drain electrode is coupled to the corresponding data line. FIGS. 2A and 2B are the downward andsectional views of the thin film transistor structure, respectively. All electrodes of the thin film transistors are manufactured by metal or alloy, as shown by the slash line in FIG. 2B, in manufacturing the panel plate. The gate electrode is formed before the first and second source/drain electrodes are formed on the substrate when manufacturing the panel plate. Thus the gate electrode is called metal layer 1 and the first and second source/drain electrodes are called metal layer 2. Take the pixel P(m,n) for example. Suppose the pixel P(m,n) includes a thin film transistor M1 whose gate, first source/drain, and second source/drain electrodes are coupled to scan line $S_m$, data line $D_n$, and pixel capacitor C1 respectively, as shown in FIG. 1. The data lines are driven by the data drivers and the scan lines are driven by the scan drivers. Both the data driver and the scan driver are installed out of the panel. The scan drivers are used for enabling the scan lines through applying scan signals to the corresponding scan lines. When one of the scan lines is enabled, each pixel in the pixel row coupled to the enabled scan line can be turned ON. The data drivers are used for applying the data signals to the corresponding pixels through the corresponding data lines when the pixels are turned ON.

The conventional active matrix liquid crystal display has the following disadvantages. First, a large number of data lines are needed. For example, an active matrix color display panel has a resolution of 1024×768, that is, having 1024 pixel columns and having 1024×3=3072 sub-pixels for each pixel row. To drive the 3072 sub-pixels for each pixel row, the active matrix display panel requires 3072 data lines. Since a large number of the data lines are required, the pitch between the adjacent data lines must be small. Secondly, each data line is coupled to the corresponding data driver through the outer lead of the tape carrier package. Connecting all data lines to the corresponding outer leads of the tape carrier packages thus becomes difficult. Thirdly, the aperture ratio of the display panel will be decreased since the number of the data lines is so large.

FIG. 3 shows the diagram of the conventional time domain multiplex driving circuit. In the conventional time domain multiplex driving circuit, every two adjacent pixels in the same pixel row are coupled to the same data line. These two pixels are set on the left and right sides of the data line, respectively. The pixel set on the left side of the data line is called the left pixel (LP) and the pixel set on the right side of the data line is called the right pixel (RP). The switching devices of the pixels LP and RP are different. Take the pixels LP(m,n) and RP(m,n) for example. These two pixels are coupled to both the same scan line $S_m$ and the same data line $D_n$. The pixel LP(m,n) is set on the left side of the data line $D_n$ and the pixel RP(m,n) is set on the right side of the data line $D_n$, as shown in FIG. 3. The switching device of the pixel RP(m,n) includes a thin film transistor M2. The gate electrode of the thin film transistor M2 is coupled to the scan line $S_m$ and the first source/drain electrode of the thin film transistor M2 is coupled to the data line $D_n$. The switching devices of the pixel LP(m,n) and the pixel RP(m,n) have respective configurations. The switching device of the pixel LP(m,n) includes two thin film transistors M11 and M12. The gate electrode of the thin film transistor M11 is coupled to the scan line $S_{m+1}$ while the first source/drain electrode of the thin film transistor M11 is coupled to the data line $D_n$. The gate electrode of the thin film transistor M12 is coupled to the scan line $S_m$ and the first source/drain electrode of the thin film transistor M12 is coupled to the second source/drain electrode of the thin film transistor M11, as shown in FIG. 3.

FIG. 4 shows a timing chart of the respective scan signals applied to the scan lines $S_m$, $S_{m+1}$, and $S_{m+2}$ and the ON and OFF status of the corresponding pixels LP(m,n), RP(m,n), LP(m+1,n), and RP(m+1,n) shown in FIG. 3. The method for driving display panel with the above-described time domain multiplex driving circuit is called a time domain multiplex driving method. When the time domain multiplex driving method is executed, each pixel row is driven in turn by the time domain multiplex driving circuit. The time domain multiplex driving method includes two scanning procedures. The first scanning procedure is to selectively turn on the left pixels of the pixel row by turning on two corresponding TFTs of each of the left pixels and then feeding the corresponding data signals into the respective left pixels. The second scanning procedure is to selectively turn on the right pixels of the pixel row by turning on one corresponding TFT of each right pixel and then feeding the corresponding data signals into the respective right pixels.

Take pixels LP(m,n) and RP(m,n) shown in FIG. 3 for example. In the time period T1, the scan lines $S_m$ and $S_{m+1}$ are enabled so that the thin film transistors M11 and M12 can be turned ON and a data signal can be applied to the corresponding pixel LP(m,n) through the TFTs M11 and M12. In the time period T2, only the scan line $S_m$ is enabled.

The thin film transistor M2 can be turned ON and a data signal can be applied to the corresponding pixel RP(m,n) through the TFT M2.

In the time domain multiplex driving circuit, the above-described disadvantages of the conventional active matrix driving circuit can be improved. If the resolution of the display panel is 1024×768, for example, every two adjacent pixels in the same pixel row are coupled to one corresponding data line of the time domain multiplex driving circuit, and thus only 3072/2=1536 data lines are needed.

However, the conventional time domain multiplex driving circuit described above has the following disadvantage. First, a longer scanning time for pixels is needed. When the TFT is turned ON, an equivalent output resistor $R_O$ between the first and second source/drain electrodes is produced. The equivalent output resistor $R_O$ can affect scanning time needed when the pixel rows are being scanned. The larger the equivalent output resistor $R_O$ is, the longer the time needed to perform scanning will be. In other words, the scanning rate will be slower. Take the pixels LP(m,n) and RP(m,n) shown in FIG. 3 for example. The switching device of the pixel LP(m,n) includes two serially connected TFTs M11 and M12. When the mth pixel row is scanned, the TFTs M11 and M12 are enabled, resulting in a resistance equivalent to the resistance of the respective output resistors of the TFTs M11 and M12 in series. Therefore, LP(m,n) has an equivalent output resistance of $2R_O$, that is, two times larger than the equivalent output resistance of the conventional switching device structure shown in FIG. 1. Therefore, when the pixels are driven by the time domain multiplex driving circuit, the scanning time needed to apply all data signals to the corresponding pixels must be longer.

Secondly, the luminance uniformity of the display cannot be achieved due to feed-through effect. Referring to FIG. 2, the coverage areas of the gate electrode (G) and the second source/drain electrode (S/D-2) on the panel overlap each other, which can be seen when TFTs on the panel are being downward. The overlapping areas between the gate electrode (G) and the second source/drain electrode (S/D-2) are substantially equivalent to a feed-through capacitor $C_{FT}$ 202. The output voltage of the TFT is lower than the input voltage of the TFT and the luminance of the pixel is degraded because of the equivalent feed-through capacitor 202. This phenomenon is called feed-through effect. The difference between the input voltage and the output voltage is called feed-through voltage. The larger the capacitance of the equivalent capacitor is, the larger the feed-through voltage is. Take the pixels LP(m,n) and RP(m,n) shown in FIG. 3 for example. The switching device of the pixel RP(m,n) includes only one TFT M2 and the switching device of the pixel LP(m,n) includes two TFTs M11 and M12. The data signal applied to the pixel RP(m,n) only through the TFTs M2 but the data signal applied to the pixel LP(m,n) through two TFTs, M11 and M12. Therefore, the equivalent capacitor of LP(m,n) is much larger than that of RP(m,n). During the driving of the pixels by the time domain multiplex driving circuit, the pixel LP(m,n) will have smaller luminance than that of the pixel RP(m,n) if the data signals of equal magnitude are applied to the pixel LP(m,n) and RP(m,n) respectively. Therefore, the luminance of the adjacent pixels may not be the same even when the data signals of equal magnitude are applied to the pixels respectively. The display performance of the liquid crystal display would thus be degraded.

In addition, the luminance of a display panel whose pixels are arranged according to the structure shown in FIG. 3 would be non-uniform when identical data signals are applied to all pixels of the display. This phenomenon can be referred to as odd-even line effect. For the display panel according to FIG. 3, each pixel of the odd (or even) pixel columns includes two TFTs and each pixel of the even (or odd) pixel columns includes one TFT, so that the equivalent capacitances of the adjacent pixel columns are different, thus resulting in the non-uniformity of luminance. The display quality of the liquid crystal display may be degraded because of the odd-even line effect.

According to the above descriptions, the conventional time domain multiplex driving circuit has the following disadvantages. First, the scanning time needed to activate pixels is longer. Secondly, the luminance of the display is not uniformly over the whole panel. Thirdly, the odd-even line effect degrades the display quality.

SUMMARY OF THE INVENTION

It is therefore an objective of the invention to provide a display apparatus with a new time domain multiplex driving circuit for driving the pixels of the display apparatus in order to achieve a reduced number of data lines for driving the display apparatus. Meanwhile, a reduced scanning time can be achieved, and the luminance uniformity as well as the display quality can be maintained.

According to the objective of the invention, it is to provide a display apparatus with a time domain multiplex driving-circuit comprises a first scan line, a first data line perpendicular to the first scan line, a first pixel and a second pixel which are set on different sides of the first data line and coupled to the same data line, a first switching device and a second switching device set in the first and second pixel respectively. The first switching device is used for selectively transmitting the pixel signal on the data line to the first pixel and the second switching device is used for selectively transmitting the pixel signal on the data line to the second pixel. When the pixel signals of equal magnitude are respectively applied to the first pixel and the second pixel, the capacitances of the equivalent feed-through capacitors of the first pixel and the second pixel are equal substantially.

Other objects, features, and advantages of the invention will become apparent from the following detailed description of the preferred but non-limiting embodiments. The following description is made with reference to the accompanying drawings.

DETAILED DESCRIPTION OF PREFERRED EMBODIMENTS

The feature of the invention is to provide a new switching device structure of the time domain multiplex driving circuit. According to the invention, the disadvantages of the conventional time domain multiplex driving circuit can be improved.

Figure 5:
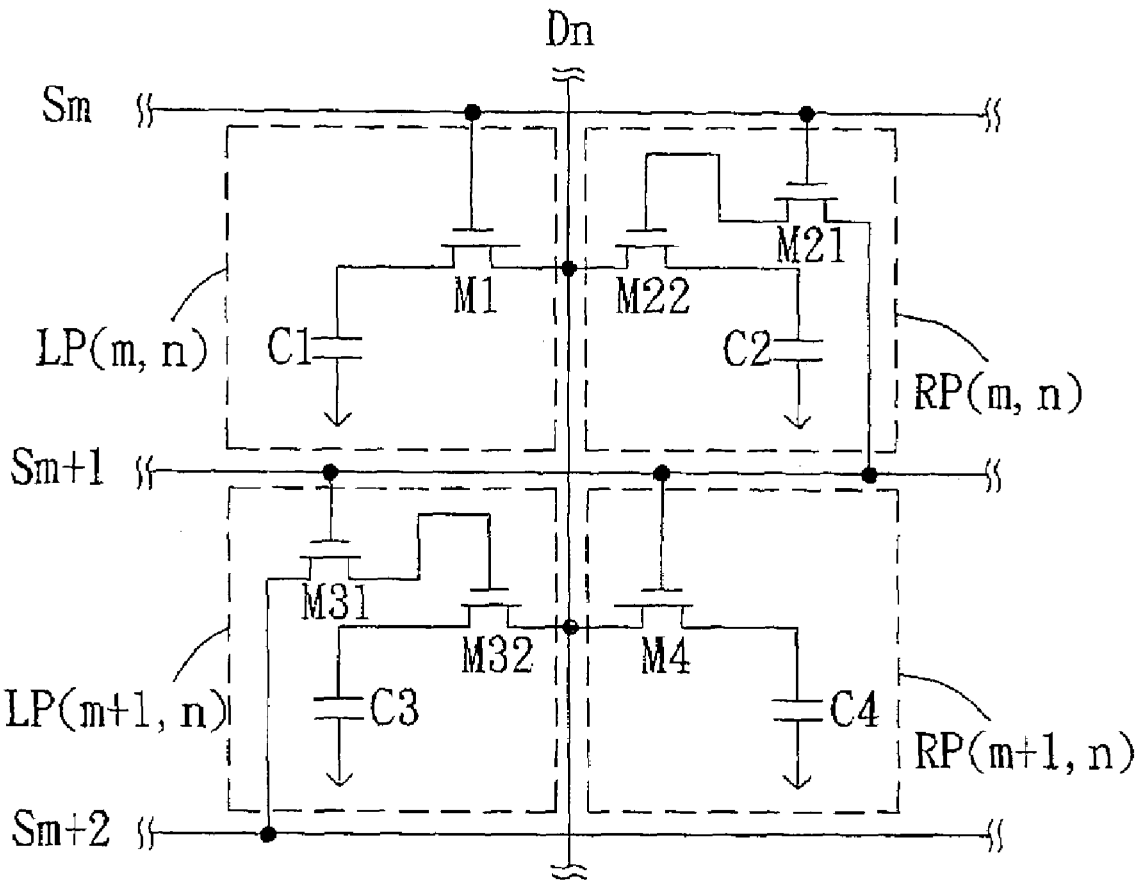
FIG. 5 shows a diagram of the driving circuit of the invention.

Referring to FIG. 5, a time domain multiplex driving circuit is shown according to a first embodiment of the invention. Take the pixel LP(m,n) and RP(m,n) shown in FIG. 5 for example; both pixels are coupled to the scan line $S_m$ and the data line $D_n$. The pixel LP(m,n) is set on the left side of the data line $D_n$, and the pixel RP(m,n) is set on the right side of the data line $D_n$, as shown in FIG. 5. The switching device of the pixel RP(m,n) includes two switches M21 and M22 which are used for selectively transmitting the data signal loaded on the data line $D_n$ to the pixel RP(m,n). The switching device of the pixel LP(m,n) includes a switch M1 which is used for selectively transmitting the data signal on the data line $D_n$ to the pixel LP(m,n). It should be noticed that all the switches can be thin film transistors. Conversely, the pixel with two switches, i.e. RP(m,n), can be set on the left side of the data line while the pixel with only one switch, i.e. LP(m,n), can then be set on the right side of the data line.

The switching device of the pixel LP(m,n) includes a thin film transistor M1. The gate electrode, first and second source/drain electrodes of the thin film transistor M1 are coupled to the scan line $S_m$source/drain, data line $D_n$, pixel capacitor C1 respectively. The switching device of the pixel RP(m,n) is different from that of the pixel LP(m,n). The switching device of the pixel RP(m,n) includes two thin film transistors M21 and M22. The gate electrode of the thin film transistor M21 is coupled to the scan line $S_m$ and the second source/drain electrode of the thin film transistor M21 is coupled to the scan line $S_{m+1}$. The gate electrode of the thin film transistor M22 is coupled to the first source/drain electrode of the thin film transistor M21 and the first source/drain electrode of the thin film transistor M22 is coupled to the data line $D_n$ and second source/drain electrode of the thin film transistor M22 is coupled to the pixel capacitor C2 respectively, as shown in FIG. 5.

The capacitance of the equivalent feed-through capacitor $C_{FT}$ can be determined through properly controlling the overlapping areas between the metal layer 1 and the metal layer 2 when manufacturing the panel. Taking LP(m,n) and RP(m,n) for example. Through properly controlling the overlapping areas between the metal layer 1 and the metal layer 2, the capacitance of the feed-through capacitor of LP(m,n) and RP(m,n) can be made equal. That is, when applying the pixel signal to LP(m,n), the feed-through voltage of the switching device set in LP(m,n) (thin film transistor M1) can be equal to the feed-through voltage of the switching device set in RP(m,n) (the serially connected thin film transistors M21 and M22) as the same pixel signal is applied to RP(m,n). Therefore, LP(m,n) and RP(m,n) can be of the same luminance when receiving the equal pixel signals. The problem that LP(m,n) and RP(m,n) have different luminance as identical pixel signals are applied, as well as the odd-even line effect and flicker can thus be avoided.

Figure 6A:
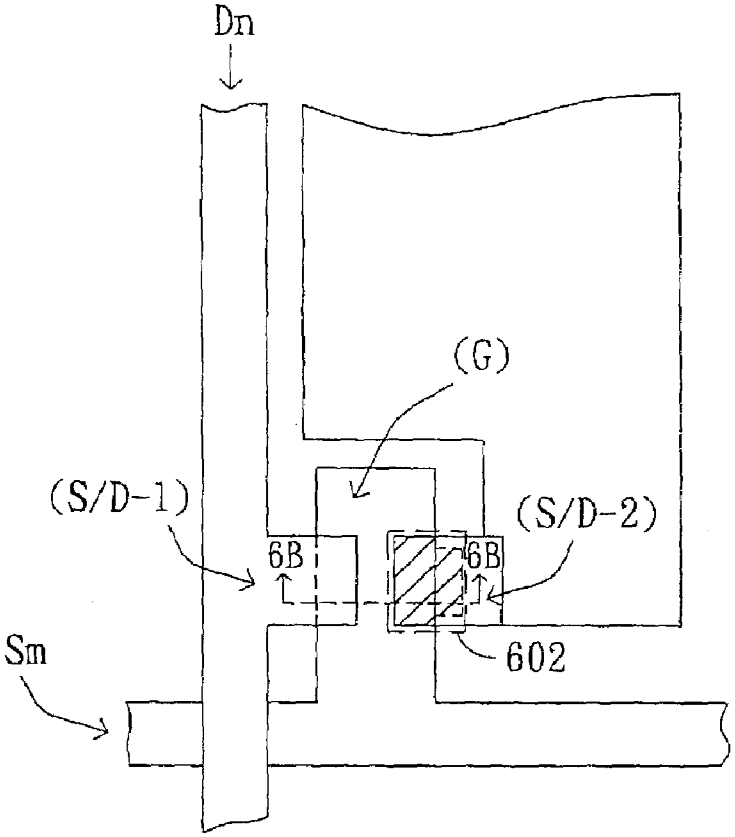
FIGS. 6A–6B illustrate a structure of the thin film transistor M22 according to a first embodiment of the invention.
Figure 6B:
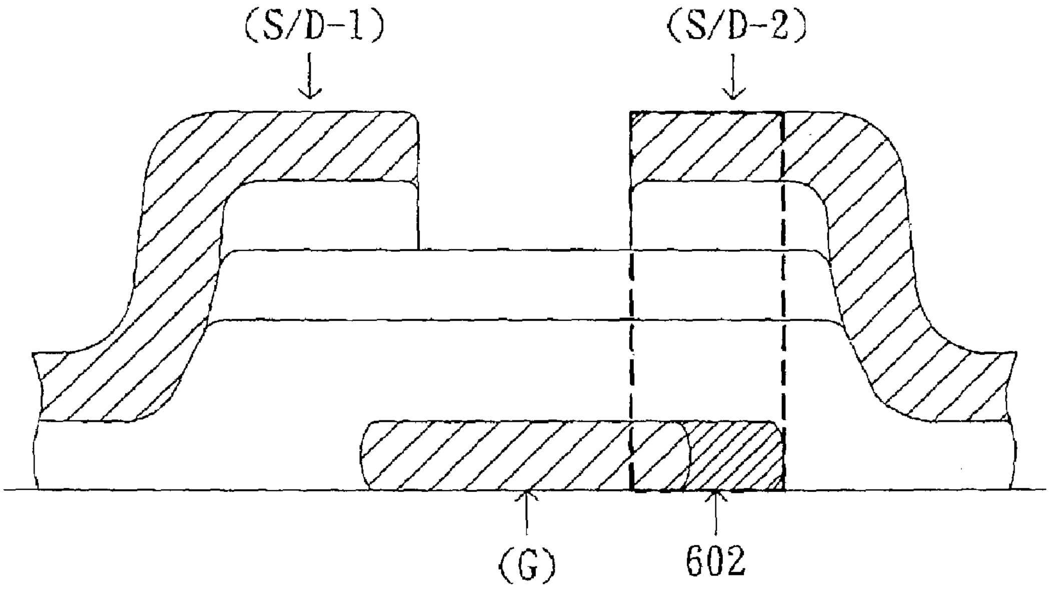
Figure 7A:
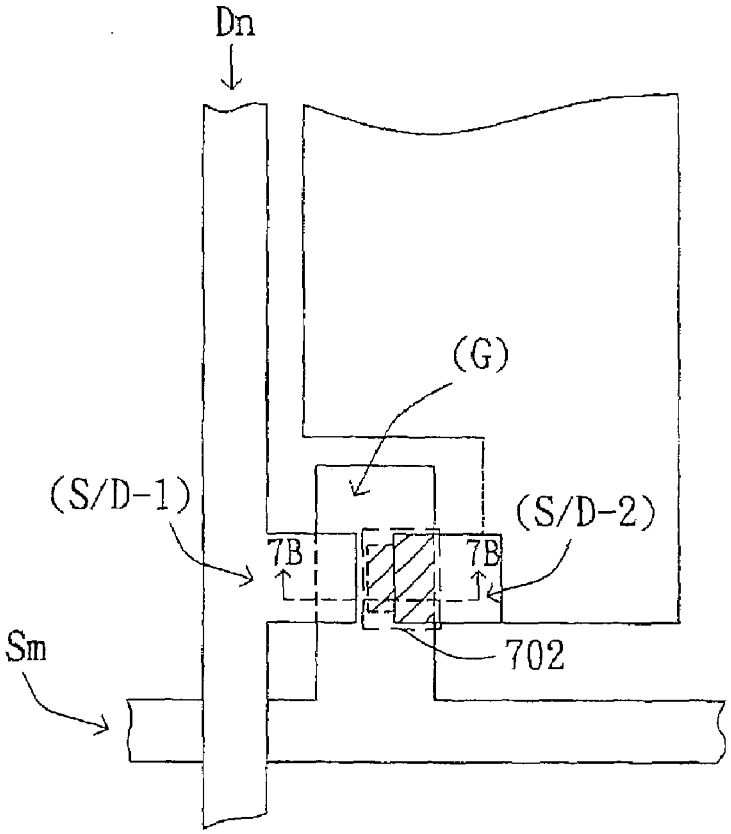
FIGS. 7A–7B illustrate a structure of the thin film transistor M22 according to a second embodiment of the invention.
Figure 7B:
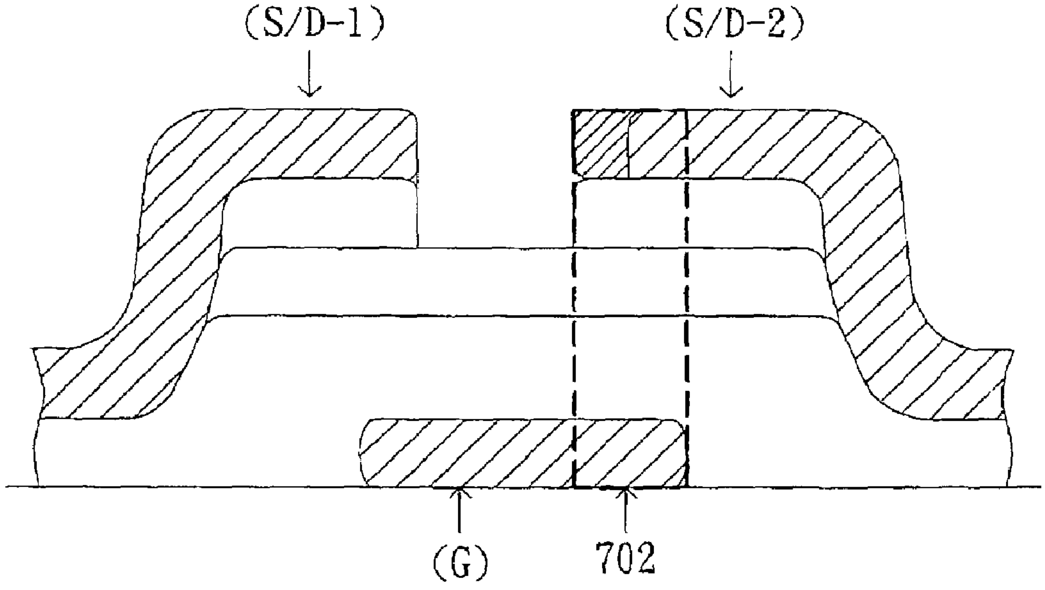

According to the invention, the respective equivalent feed-through capacitors of the LP(m,n) and RP(m,n) can be set equal by controlling the ratio between capacitances of the respective equivalent feed-through capacitors of thin film transistor M1 ($C_{FT1}$) and thin film transistor M22 ($C_{FT22}$), for example, through determining the overlapping areas between the metal layer 1 and the metal layer 2. Through experiment, if the capacitance of the pixel capacitor ($C_{LC}$) is set to 0.278 pF and the equivalent storage capacitor ($C_{ST}$) is set to 0.180 pF, the ratio between the capacitances of the equivalent feed-through capacitors of M1 ($C_{FT1}$) and M22 ($C_{FT22}$) is about 1.66/1.56. In this manner, the magnitude of the feed-through voltage of each pixel on the display panel can be equal. Referring to FIGS. 6A–6B, a structure of the thin film transistor M22 is shown according to the first embodiment of the invention. FIG. 6A is a downward view and FIG. 6B is a sectional view. In this embodiment, the overlapping areas between the gate electrode (G) and the second source/drain electrode (S/D-2) of M22 are enlarged through increasing the coverage area of the metal layer 1, as shown in FIGS. 6A–6B. Therefore, the equivalent feed-through capacitor 602 of M22 ($C_{FT22}$) can be larger than that of M1 ($C_{FT1}$) 202 in capacitance. In this way, the ratio between the capacitances of the equivalent feed-through capacitor of M1 ($C_{FT1}$) and that of M22 ($C_{FT22}$) can be determined through the above-disclosed method. The feed-through voltages of LP(m,n) and RP(m,n) can thus be made equal. Referring to FIGS. 7A–7B, a structure of the thin film transistor M22 is illustrated according to a second embodiment of the invention, wherein FIG. 7A is a downward view and FIG. 7B is a sectional view. In this embodiment, the overlapping areas between the gate electrode (G) and the second source/drain electrode (S/D-2) of M22 are enlarged during the manufacturing process of the panel through increasing the coverage area of the metal layer 2, as shown in FIGS. 7A–7B. Therefore, the capacitance of the equivalent feed-through capacitor 602 of M22 ($C_{FT22}$) can be larger than that of M1 ($C_{FT1}$) 202. The ratio between the capacitances of the equivalent feed-through capacitors of M1 ($C_{FT1}$) and M22 ($C_{FT22}$) can be determined through the above-disclosed method. The feed-through voltages of LP(m,n) and RP(m,n) can thus be equal.

Two adjacent pixels which are coupled to the same scan line and the data line can be referred to as a pixel group. For example, LP(m,n) and RP(m,n) which are coupled to the scan line $S_m$ and the data line $D_n$ can be referred to as pixel group P(m,n). Referring to FIG. 5, the switching device of LP(m,n) is identical with that of RP(m+1,n) and the switching device of RP(m,n) is identical with that of LP(m+1,n). In this manner, the pixel group P(m,n) is the mirror image of the adjacent pixel group P(m+1,n), and vice versa.

The mirror-image configuration of the switching devices of any two adjacent pixel groups for each pixel row is advantageous to the display quality. The odd-even line effect can be further improved in this configuration. Firstly, the configuration of the switching device of each pixel on each side of the same data line is different. In addition, the capacitance of the equivalent feed-through capacitor of each pixel can be determined by the use of the above-disclosed method of the invention. Therefore, the odd-even line effect can thus be further reduced, resulting in improved display quality.

Figure 8:
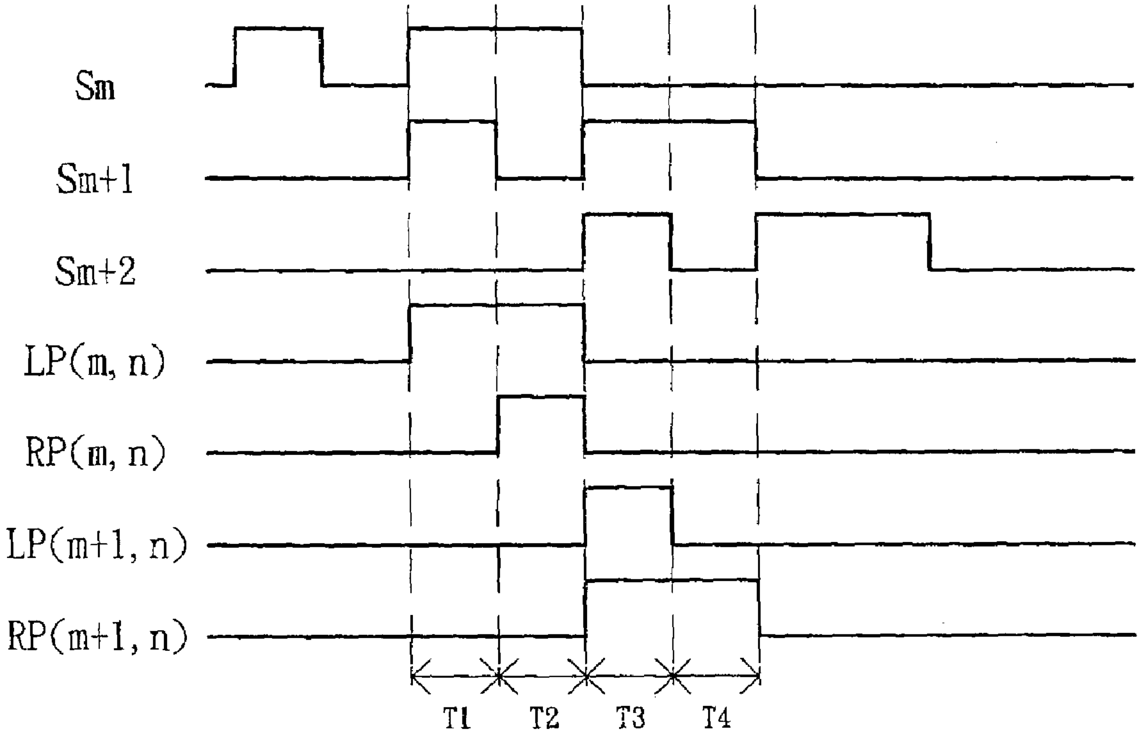
FIG. 8 is a timing chart of the scan signals of the scan line $S_m$, $S_{m+1}$, and $S_{m+2}$ and the ON and OFF status of the corresponding pixels LP(m,n), RP(m,n), LP(m+1,n), and RP(m+1,n) shown in FIG. 5.

FIG. 8 is a timing chart of the scan signals of the scan line $S_m$, $S_{m+1}$, and $S_{m+2}$ and the ON and OFF status of the corresponding pixels LP(m,n), RP(m,n), LP(m+1,n), and RP(m+1,n) shown in FIG. 5. The time domain multiplex driving method performed by the above-disclosed time domain multiplex driving circuit is used for driving each pixel row in turn. The time domain multiplex driving method includes two scanning procedures. Take pixels LP(m,n) and RP(m,n) shown in FIG. 5 for example. In the time period T1, the first scanning procedure is executed so that the scan line $S_m$ and $S_{m+1}$ are enabled. The enabled scan line $S_m$ can turn ON the thin film transistor M21 and the enabled scan line $S_{m+1}$ can turn ON the thin film transistor M22. In this manner, the pixel signal for activating RP(m,n) can then be applied from the data line $D_n$ to RP(m,n), and the first scanning procedure of the time domain multiplex driving method is thus completed.

After that, in the time period T2, the second scanning procedure is executed to disable the scan line $S_{m+1}$. The thin film transistor M22 is turned OFF after the scan line $S_{m+1}$ is disabled. The thin film transistor M1, however, is still ON so that the pixel signal for activating LP(m,n) can be applied from the data line $D_n$ to LP(m,n). In this manner, the second scanning procedure of the time domain multiplex driving method is accomplished.

It should be noticed that the corresponding data signals of the left and right pixels are correctly applied to the pixels during the first and second scanning procedures. When the first scanning procedure is executed, the thin film transistor of the pixel LP(m,n), M1, as well as the thin film transistors M21 and M22 in the pixel RP(m,n), is turned ON. Thus, the corresponding data signal of the pixel RP(m,n) is applied to the pixel LP(m,n) as well. Nevertheless, the corresponding data signal of the pixel LP(m,n) can be correctly applied to the pixel LP(m,n) immediately after the second scanning procedure is performed. When the second scanning procedure is executed, the thin film transistor of the pixel LP(m, n), M1, is still turned ON and the corresponding data signal of the pixel LP(m,n) is applied to the pixel LP(m,n) through the data line $D_n$. Meanwhile, the corresponding data signal of the pixel LP(m,n) is prevented from being erroneously applied to the pixel RP(m,n) during the time period T2. The pixel RP(m,n) cannot be turned ON because one of its thin film transistors, such as the thin film transistor M21, is enabled while the another one is not enabled, such as the thin film transistor M22. In this way, after the first and second scanning procedures are accomplished, the corresponding data signals of the pixels LP(m,n) and RP(m,n) are applied to the corresponding pixels respectively.

After the pixels of the mth pixel row is scanned, the (m+1)th pixel row is scanned. The scanning of the (m+1)th pixel row also includes two scanning procedures. In the time period T3, the first scanning procedure is performed to activate all LPs of the (m+1)th pixel row, such as LP(m+1, n). Next, the second scanning procedure is performed during the time period T4 to activate all RPs of the (m+1)th pixel row, such as RP(m+1,n). The scanning procedures for activating the (m+1)th pixel row are identical with that for activating the mth pixel row. In this way, the two scanning procedures are performed for all pixel rows so as to display a frame on the display panel.

Figure 1:
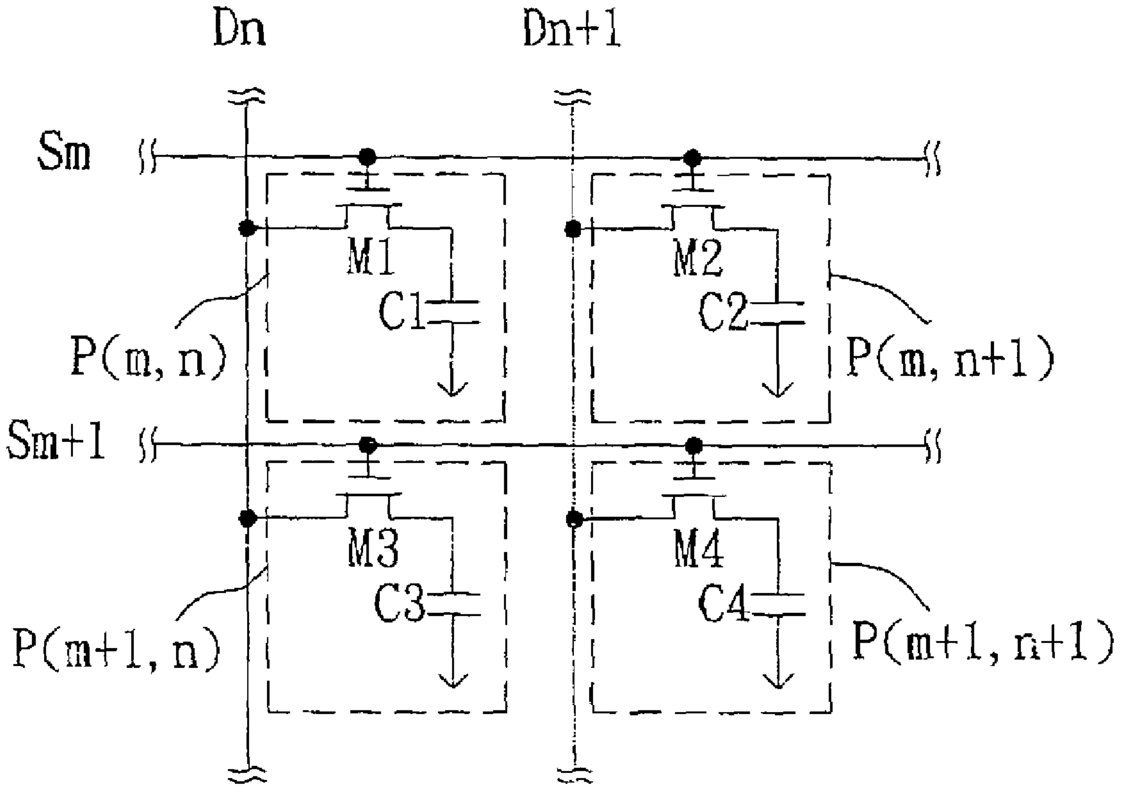
FIG. 1(PRIOR ART)
FIG. 1 (Prior Art) shows the configuration of a conventional active matrix liquid crystal display.
Figure 2A:
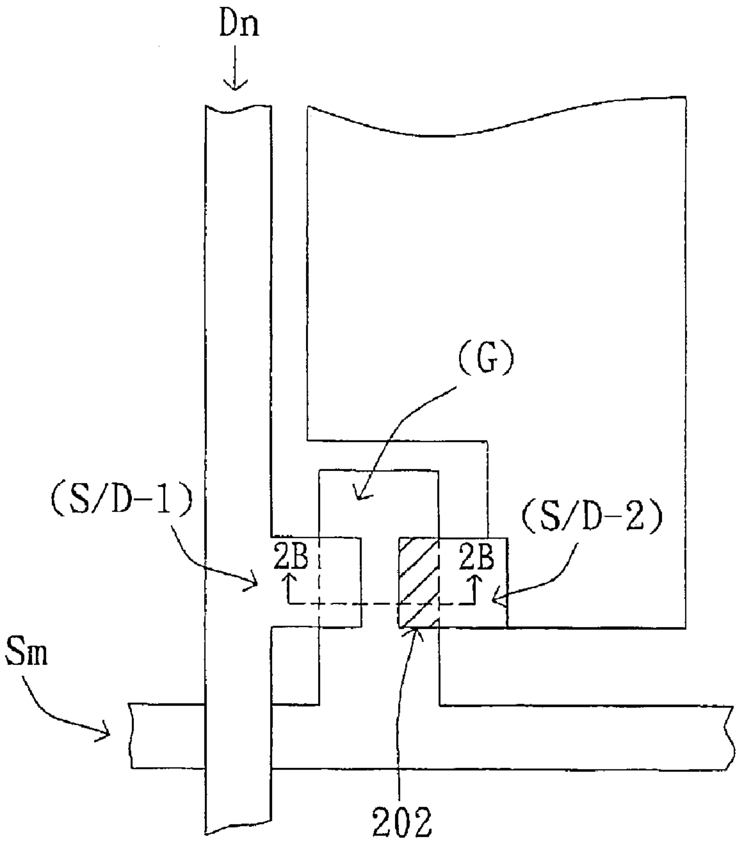
FIG. 2A(PRIOR ART)
FIGS. 2A–2B (Prior Art) illustrate the structure diagram of the thin film transistor.
Figure 2B:
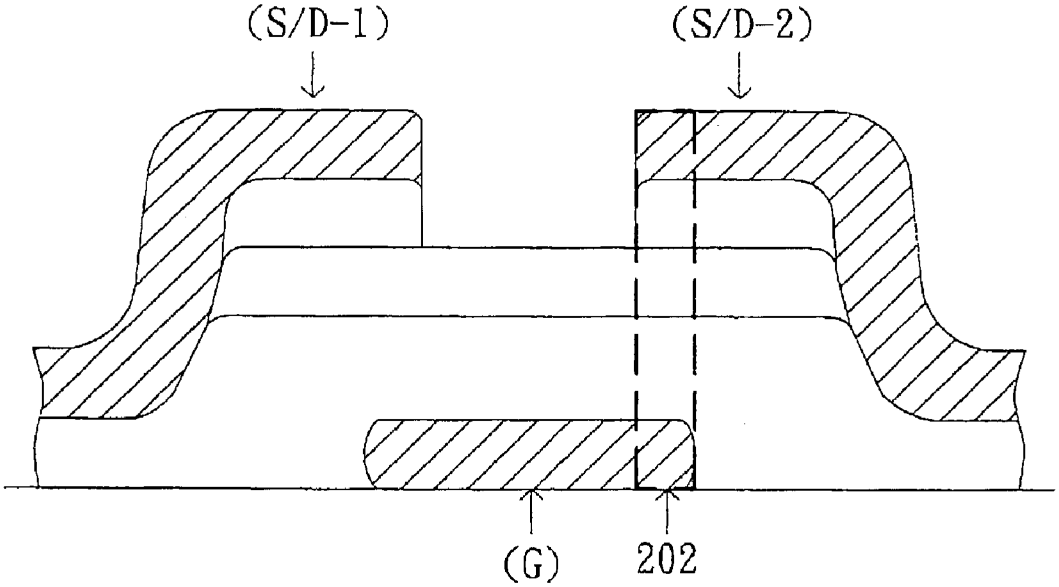
FIG. 2B(PRIOR ART)
Figure 3:
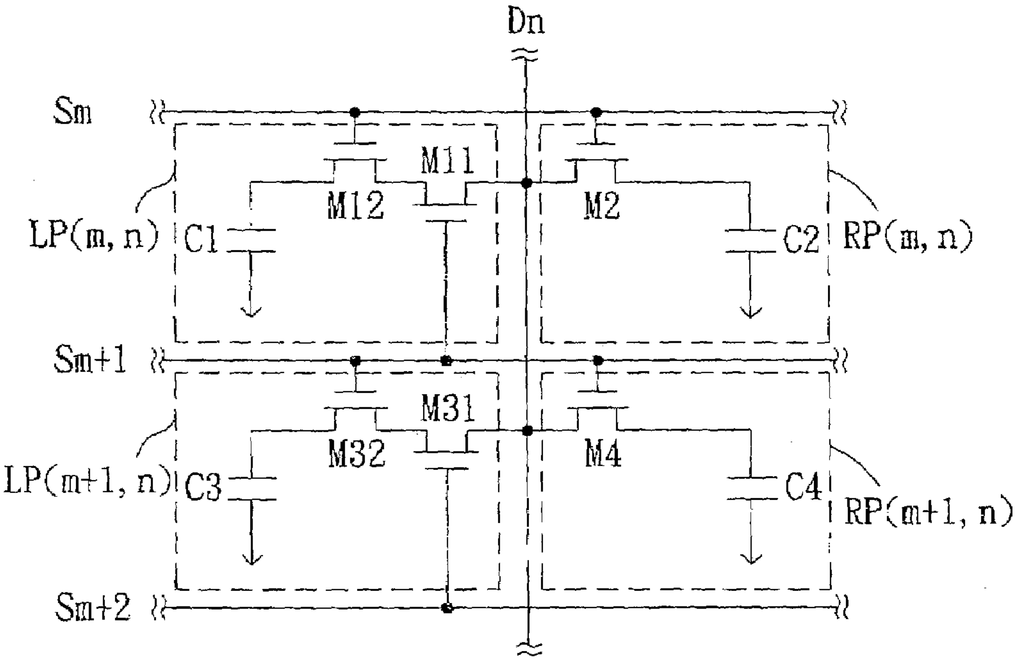
FIG. 3(PRIOR ART)
FIG. 3 (Prior Art) illustrates a conventional time domain multiplex driving circuit.
Figure 4:
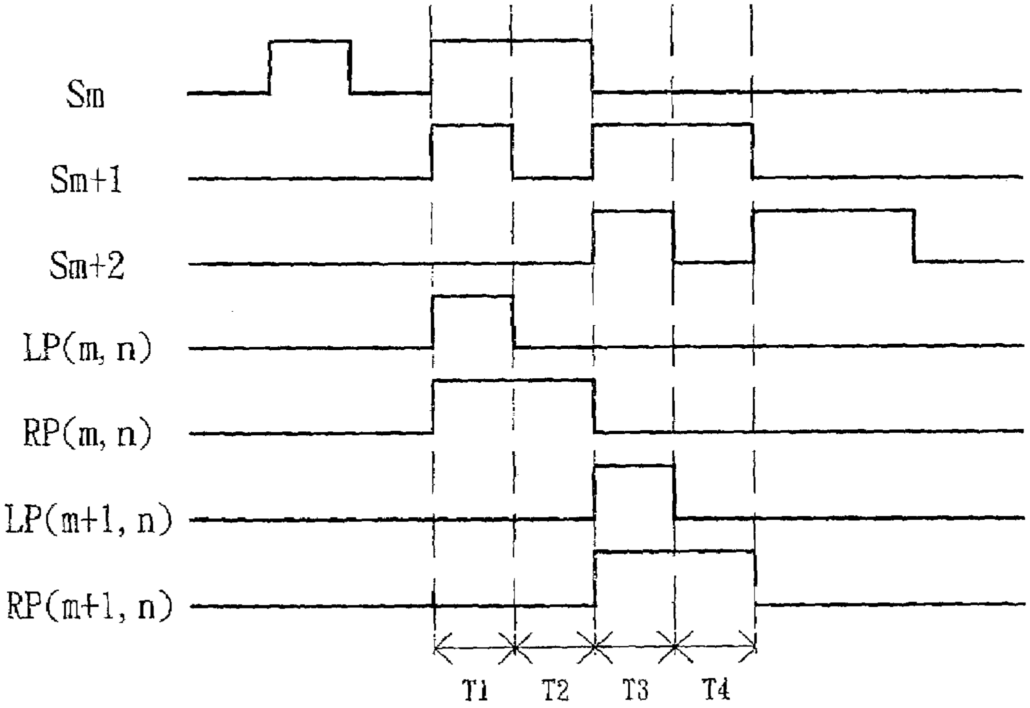
FIG. 4(PRIOR ART)
FIG. 4 (Prior Art) is a timing chart of the scan signals of the scan line $S_m$, $S_{m+1}$, and $S_{m+2}$ and the ON and OFF status of the corresponding pixels LP(m,n), RP(m,n), LP(m+1,n), and RP(m+1,n) shown in FIG. 3.

Compared to the conventional time domain multiplex driving circuit shown in FIG. 3, the time domain multiplex driving circuit of the invention shown in FIG. 5 has different switching device operations. Take the pixel LP(m,n) of the conventional time domain multiplex driving circuit shown in FIG. 3 for example., The switching device of the pixel LP(m,n) includes two thin film transistors M11 and M12, wherein the gate electrodes of the thin film transistors M11 and M12 are coupled to the scan lines $S_m$ and $S_{m+1}$ respectively. Therefore, the ON and OFF status of the thin film transistor M11 is independent from that of the thin film transistor M12 or vice versa. On the other hand, take the pixel RP(m,n) of the time-division deriving circuit of the present invention shown in FIG. 5 for example. The switching device of the pixel RP(m,n) includes two thin film transistors M21 and M22, wherein the gate electrode of the thin film transistor M22 is coupled to the second source/drain electrode of M21. Therefore, the ON and OFF status of the thin film transistor M22 is controlled by that of the thin film transistor M21. The thin film transistor M22 is enabled only if the thin film transistor M21 is enabled.

Moreover, the corresponding data signal can be applied to the pixel RP(m,n) through the thin film transistor M22 only, as shown in FIG. 5. Thus, the equivalent output resistance of the pixel RP(m,n) is $R_O$. As compared with the pixel RP(m,n) in FIG. 5, the equivalent output resistance of the pixel LP(m,n) in FIG. 3 is twice as large as RP(m,n), $2R_O$. That is, a reduced equivalent output resistance can be achieved in the time domain multiplex driving circuit of the invention. Therefore, a reduced scanning time is sufficient to feed all data signals into the corresponding pixels and the scanning rate of the invention can thus be increased.

In addition, the feed-through voltages of all pixels can be made equal in magnitude substantially by properly controlling the capacitance of the equivalent feed-through capacitor of each pixel. Therefore, the luminance of the pixels can be made uniform when identical pixel signals are applied to the pixels. The display performance of the display panel can thus be improved.

The display apparatus with the driving circuit in accordance with the invention has the following advantages. First, a reduced number of the data lines can be achieved. The pitch between the adjacent data lines can thus be increased so that connecting all data lines to the corresponding outer leads of the tape carrier packages becomes much easier than the conventional approach. In addition, an increased aperture ratio of the display panel is achieved because of the reduced number of the data lines. Further, a reduced scanning time can be achieved through the switching device configuration of the invention because the equivalent output resistances of the pixels of the invention are smaller than those of the pixels of the conventional time domain multiplex driving circuit. Moreover, the odd-even line effect on the luminance uniformity can be reduced because the capacitances of the equivalent feed-through capacitors of all pixels can be made equal by controlling the equivalent feed-through capacitances of all pixels during the panel manufacturing process. If the configuration of the pixels is in mirror image form, the luminance uniformity can be further improved to enhance the display quality and the odd-even line effect on the display quality can be avoided.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus with a time domain multiplex driving circuit, comprising:

a plurality of parallel scan lines arranged in a first direction, wherein the scan lines includes a first scan line;

a plurality of parallel data lines arranged in a second direction which is perpendicular to the first direction, wherein the data lines includes a first data line;

a first pixel coupled to the first data line and the first scan line;

a second pixel coupled to first data line and the first scan line, wherein the first pixel and the second pixel are set on different sides of the first data line;

a first switching device, set in the first pixel, for selectively transmitting a first data signal on the first data line to the first pixel, the first switching device including at least two thin film transistors and a first equivalent feed-through capacitor; and a second switching device, set in the second pixel, for selectively transmitting a second data signal on the first data line to the second pixel, the second switching device including at least one thin film transistor and a second equivalent feed-through capacitor;

wherein the ratio between the capacitance of the first equivalent feed-through capacitor and the capacitance of the second equivalent feed-through capacitor is determined with respect to pixel capacitances and storage capacitances of the first and second pixels so tat the feed-through voltages of the first pixel and the second pixel are substantially equal when the first data signal and the second data signal are equal;

wherein the feed-through voltages of the first pixel and the second pixel is made equal substantially by using overlapping area control on the thin film transistors of the first and second switching devices so that the capacitances of the first and the second equivalent feed-through capacitors are set according to the determined ratio.

2. The display apparatus according to claim 1, wherein the display apparatus is a liquid crystal display (LCD).

3. A display apparatus with a time domain multiplex driving circuit, comprising:

a plurality of parallel scan lines arranged in a first direction, wherein the scan lines includes a first scan line and a second scan line, and the first scan line is adjacent to the second scan line;

a plurality of parallel data lines arranged in a second direction which is perpendicular to the first direction, wherein the data lines includes a first data line;

a first pixel coupled to the first data line, the first scan line, and the second scan line;

a second pixel coupled to the first data line and the first scan line, wherein the first pixel and the second pixel are set on different sides of the first data line;

a first switching device, set in the first pixel, for selectively transmitting a first data signal on the first data line to the first pixel, wherein the first switching device includes at least a first switch and a second switch, and the first switch is controlled by the second switch, the first switch including a first equivalent feed-through capacitor; and a second switching device, set in the second pixel, for selectively transmitting a second data signal on the first data line to the second pixel, the second switching device including at least a third switch, the third switch including a second equivalent feed-through capacitor;

wherein the ratio between the capacitance of the first equivalent feed-through capacitor and the capacitance of the second equivalent feed-through capacitor is determined with respect to pixel capacitances and storage capacitances of the first and second pixels so that the feed-through voltages of the first pixel and the second pixel are equal substantially when the first data signal and the second data signal are of equal;

wherein the feed-through voltages of the first pixel and the second pixel are made equal substantially by using overlapping area control on the first and third switches so that the capacitances of the first and second equivalent feed-through capacitors are set according to the determined ratio.

4. The display apparatus according to claim 3, wherein the first switch, the second switch and the third switch are thin film transistors (TFTs).

5. The display apparatus according to claim 3, wherein the first pixel is set on the left side of the first data line and the second pixel is set on the right side of the first data line.

6. The display apparatus according to claim 3, wherein the first pixel is set on the right side of the first data line and the second pixel is set on the left side of the first data line.

7. The display apparatus according to claim 3, wherein the first switch includes a gate electrode, a first source/drain electrode, and a second source/drain electrode, wherein the first source/drain electrode is coupled to the first data line and the gate electrode is coupled to the second switch.

8. The display apparatus according to claim 3, wherein the third switch includes a gate electrode, a first source/drain electrode, and a second source/drain electrode, wherein the first source/drain electrode is coupled to the first data line and the gate electrode is coupled to the first scan line.

9. The display apparatus according to claim 3, wherein the second switch includes a gate electrode, a first source/drain electrode, and a second source/drain electrode, wherein the first source/drain electrode is coupled to the first switch.

10. The display apparatus according to claim 9, wherein the second source/drain electrode of the second switch is coupled to the second scan line and the gate electrode is coupled to the first scan line.

11. The display apparatus according to claim 10, wherein the time domain multiplex driving circuit is driven by:

enabling the first scan line and the second scan line;

applying the first data signal to the first data line;

disabling the second scan line;

applying the second data signal to the first data line; and disabling the first scan line;

wherein the first data signal is used for driving the first pixel and the second data signal is used for driving the second pixel.

12. The display apparatus according to claim 3, wherein the first switch further includes a gate electrode and a second source/drain electrode, wherein the capacitance of the first equivalent feed-through capacitor is determined by controlling the overlapping areas between the gate electrode and the second source/drain electrode so that the capacitances of the first and second equivalent feed-through capacitors are set according to the determined ratio.

13. The display apparatus according to claim 3, wherein the third switch further includes a gate electrode and a second source/drain electrode, wherein the capacitance of the second equivalent feed-through capacitor is determined by controlling the overlapping areas between the gate electrode and the second source/drain electrode so that the capacitances of the first and second equivalent feed-through capacitors are set according to the determined data.

14. The display apparatus according to claim 3, wherein the display apparatus is a liquid crystal display (LCD).

15. A display apparatus with a time domain multiplex driving circuit, comprising:

a plurality of parallel scan lines arranged in a first direction, wherein the scan lines includes a first scan line, a second scan line, and a third scan line, and the second scan line is adjacent to the first scan line and the third scan line;

a plurality of parallel data lines arranged in a second direction which is perpendicular to the first direction, wherein the data lines includes a first data line;

a first pixel coupled to the first data line, the first scan line, and the second scan line;

a second pixel coupled to the first data line and the first scan line, wherein the first pixel and the second pixel are set on different sides of the first data line;

a third pixel coupled to the first data line and the second scan line;

a fourth pixel coupled to the first data line, the first scan line, and the second scan line, wherein the third pixel and the fourth pixel are set on different sides of the first data line, the third pixel and the first pixel are set on the same side of the first data line, and the fourth pixel and the second pixel are set on the other side of the first data line;

a first switching device, set in the first pixel, for selectively transmitting a first data signal on the first data line to the first pixel, wherein the first switching device includes at least a first switch and a second switch, and the first switch is controlled by the second switch, the first switch including a first equivalent feed-through capacitor;

a second switching device, set in the second pixel, for selectively transmitting a second data signal from the first data line to the second pixel, wherein the second switching device includes at least a third switch, the third switch including a second equivalent feed-through capacitor;

a third switching device, set in the third pixel, for selectively transmitting a third data signal from the first data line to the third pixel, wherein the third switching device includes at least a fourth switch, the fourth switch including a third equivalent feed-through capacitor; and a fourth switching device, set in the fourth pixel, for selectively transmitting a fourth data signal on the first data line to the fourth pixel, wherein, the fourth switching device includes at least a fifth switch and a sixth switch, and the fifth switch is controlled by the sixth switch, the fifth switch including a fourth equivalent feed-through capacitor;

wherein the ratio between the capacitance of the first equivalent feed-through capacitor to the capacitance of the second equivalent feed-through capacitor is determined with respect to pixel capacitance and storage capacitance of the first and second pixels and the ratio between the capacitance of the third equivalent feed-through capacitor to the capacitance of the fourth equivalent feed-through capacitor is determined with respect to pixel capacitance and storage capacitance of the third and fourth pixels so that the feed-through voltages of the first, second, third, and fourth pixels can be substantially equal when the first, second, third, fourth data signals are equal;

wherein the feed-through voltages of the first, second, third, and fourth pixels can be made equal substantially by using overlapping area control on the first, third, fourth, and fifth switches so that the capacitances of the first, second, third, and fourth equivalent feed-through capacitors are set according to the respective determined ratios.

16. The display apparatus according to claim 15, wherein the first, second, third, fourth, fifth, and sixth switches are thin film transistors (TFTs).

17. The display apparatus according to claim 15, wherein the first pixel is set on the left side of the first data line and the second pixel is set on the right side of the first data line.

18. The display apparatus according to claim 15, wherein the first pixel is set on the right side of the first data line and the second pixel is set on the left side of the first data line.

19. The display apparatus according to claim 15, wherein the first switch includes a gate electrode, a first source/drain electrode, and a second source/drain electrode, wherein the first source/drain electrode is coupled to the first data line and the gate electrode is coupled to the second switch.

20. The display apparatus according to claim 15, wherein the third switch includes a gate electrode, a first source/drain electrode, and a second source/drain electrode, wherein the first source/drain electrode is coupled to the first data line and the gate electrode is coupled to the first scan line.

21. The display apparatus according to claim 15, wherein the fourth switch includes a gate electrode, a first source/drain electrode, and a second source/drain electrode, wherein the first source/drain electrode is coupled to the first data line and the gate electrode is coupled to the second scan line.

22. The display apparatus according to claim 15, wherein the fifth switch includes a gate electrode, a first source/drain electrode, and a second source/drain electrode, wherein the first source/drain electrode is coupled to the first data line and the gate electrode is coupled to the sixth switch.

23. The display apparatus according to claim 15, wherein both of the second switch and the sixth switch include a gate electrode, a first source/drain electrode, and a second source/drain electrode, wherein the first source/drain electrode of the second switch is coupled to the first switch and the first source/drain electrode of the sixth switch is coupled to the fifth switch.

24. The display apparatus according to claim 23, wherein the second source/drain electrode of the second switch is coupled to the second scan line, the gate electrode of the second switch is coupled to the first scan line, the second source/drain electrode of the sixth switch is coupled to the third scan line, the gate electrode of the sixth switch is coupled to the second scan line.

25. The display apparatus according to claim 24, wherein the time domain multiplex driving circuit of the display apparatus is driven by:

enabling the first scan line and the second scan line;
applying the first data signal to the first data line;
disabling the second scan line;
applying the second data signal to the first data line;
disabling the first scan line;
enabling the second scan line and the third scan line;
applying the fourth data signal to the first data line;
disabling the third scan line;
applying the third data signal to the first data line; and
disabling the second scan line;
wherein the first data signal is used for driving the first pixel, the second data signal is used for driving the second pixel, the third data signal is used for driving the third pixel, and the fourth data signal is used for driving the fourth pixel.

26. The display apparatus according to claim 15, wherein the first switch further includes a gate electrode and a second source/drain electrode, wherein the capacitance of the first equivalent feed-through capacitor is determined through controlling the overlapping areas between the gate electrode and the second source/drain electrode so that the capacitances of the first and second equivalent feed-through capacitors are set according to the determined ratio between the capacitances of the first and second equivalent feed-through capacitors.

27. The display apparatus according to claim 15, wherein the third switch further includes a gate electrode and a second source/drain electrode, wherein the capacitance of the second equivalent feed-through capacitor is determined though controlling the overlapping areas between the gate electrode and the second source/drain electrode so tat the capacitances of the first and second equivalent feed-through capacitors are set according to the determined ratio between the capacitances of the first and second equivalent feed-through capacitors.

28. The display apparatus according to claim 15, wherein the fourth switch further includes a gate electrode and a second source/drain electrode, wherein the capacitance of the third equivalent feed-through capacitor is determined through controlling the overlapping areas between the gate electrode and the second source/drain electrode so that the capacitances of the third and fourth equivalent feed-through capacitors are set according to the determined ratio between the capacitances of the third and fourth equivalent feed-though capacitors.

29. The display apparatus according to claim 15, wherein the fifth switch further includes a gate electrode and a second source/drain electrode, wherein the capacitance of the fourth equivalent feed-through capacitor is determined through controlling the overlapping areas between the gate electrode and the second source/drain electrode so that the capacitances of the third end fourth equivalent feed-through capacitors are set according to the determined ratio between the capacitances of the third and fourth equivalent feed-though capacitors.

30. The display apparatus according to claim 15, wherein the display apparatus is a liquid crystal display (LCD).

* * * * *